Figure 6:
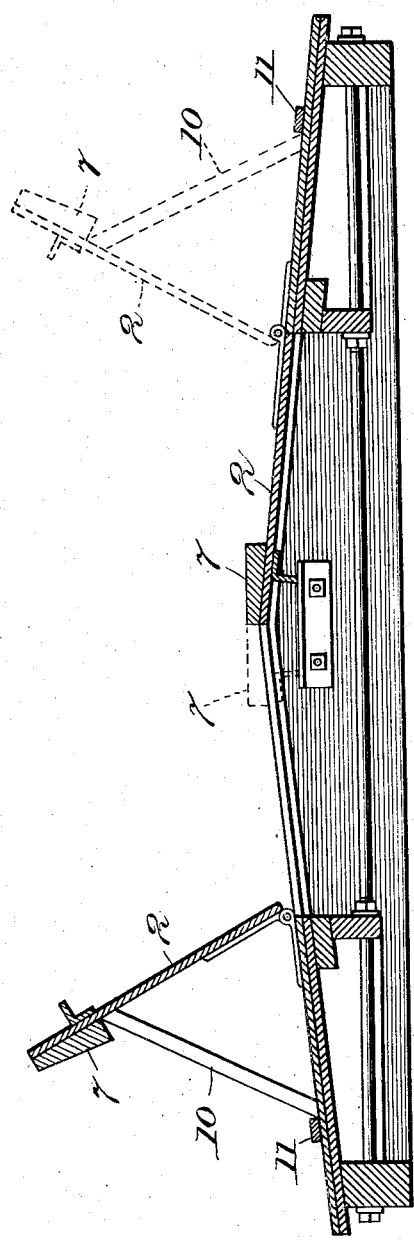

E. POSSON.
ROOF DOOR FOR CARS.
APPLICATION FILED MAY 10, 1907.
1,015,397.
Patented Jan. 23, 1912.
3 SHEETS—SHEET 1.
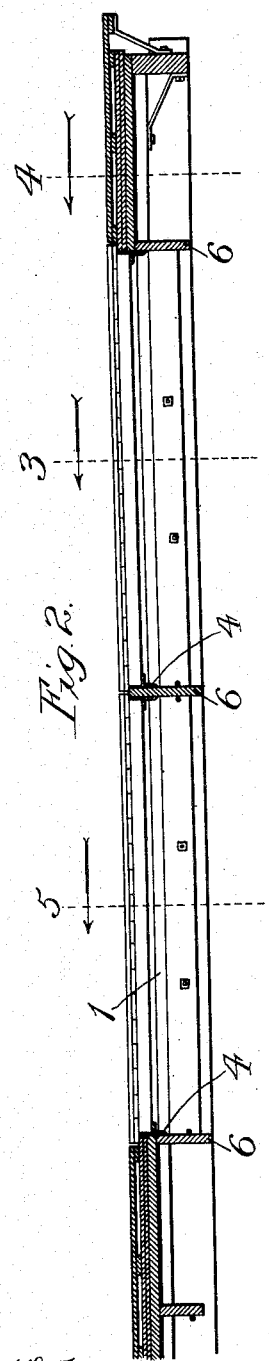
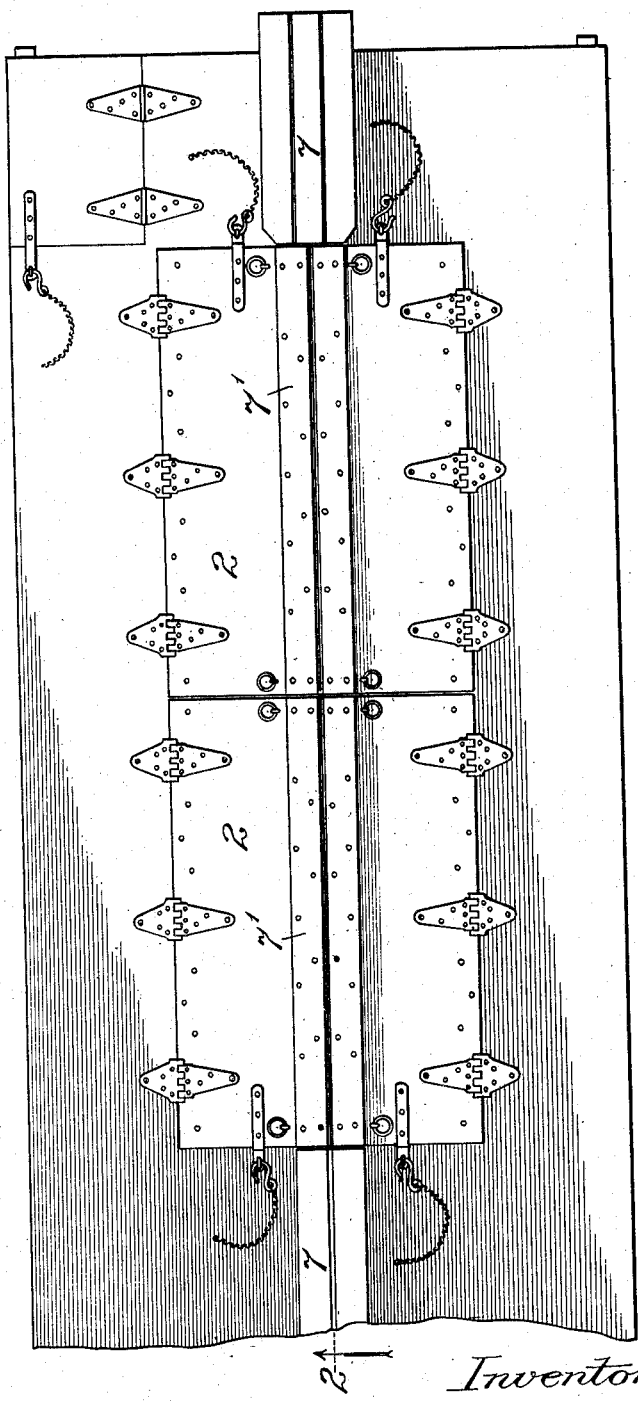
Witnesses:
Inventor:
Edward Posson,
By Sheridan & Wilkinson
Attys.

E. POSSON.
ROOF DOOR FOR CARS.
APPLICATION FILED MAY 10, 1907.
1,015,397.
Patented Jan. 23, 1912.
3 SHEETS—SHEET 2.
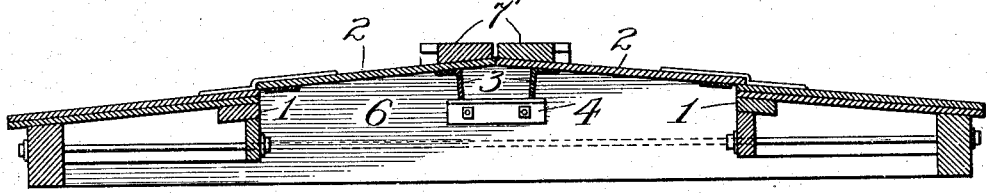
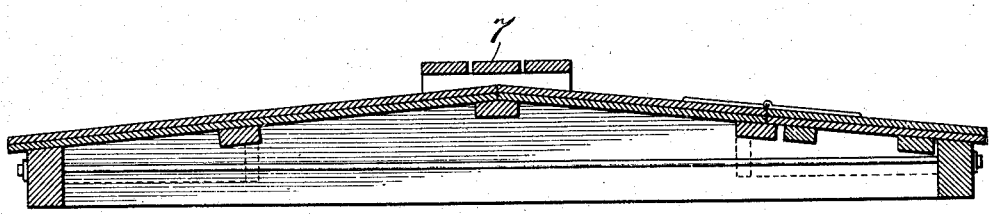
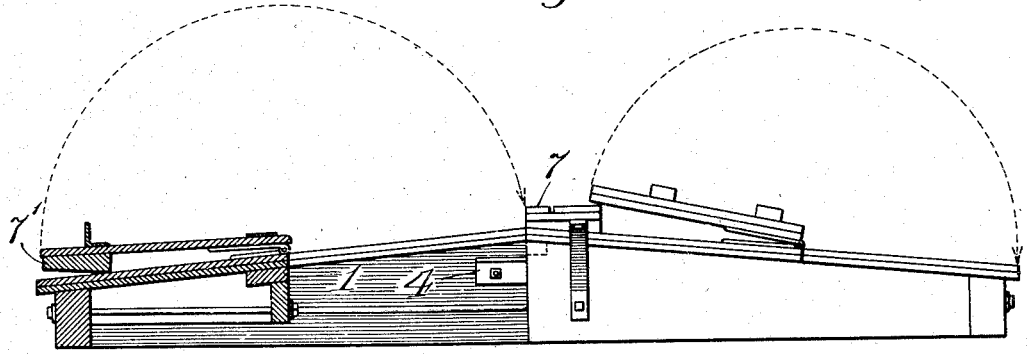
Witnesses:
Inventor:
Edward Posson.
By Sheridan & Wilkinson
Attys.

E. POSSON.
ROOF DOOR FOR CARS.
APPLICATION FILED MAY 10, 1907.

1,015,397.

Patented Jan. 23, 1912.
3 SHEETS—SHEET 3.

Witnesses:
Harry S. Gaither
Henry A. Parks

Inventor:
Edward Posson
by Sheridan H Wilkinson
attys

UNITED STATES PATENT OFFICE.

EDWARD POSSON, OF CHICAGO, ILLINOIS, ASSIGNOR TO NATIONAL DUMP CAR COMPANY, OF CHICAGO, ILLINOIS, A CORPORATION OF MAINE.

ROOF-DOOR FOR CARS.

1,015,397.  Specification of Letters Patent.  Patented Jan. 23, 1912.

Application filed May 10, 1907. Serial No. 372,969.

*To all whom it may concern:*

Be it known that I, EDWARD POSSON, a citizen of the United States, residing at Chicago, in the county of Cook and State of Illinois, have invented certain new and useful Improvements in Roof-Doors for Cars, of which the following is a specification.

The object of my invention is to provide a car with roof doors so constructed and arranged that the doors may be arranged in the form of a hopper, thus facilitating the operation of loading, and also to provide a water-proof door.

In the drawings—Figure 1 is a plan view of a portion of a car roof embodying my invention. Fig. 2 is a longitudinal cross section through the structure shown in Fig. 1. Fig. 3 is a transverse section through the car roof showing my improved doors, said section being taken on the line 3 of Fig. 2. Fig. 4 is a section on the line 4 of Fig. 2. Fig. 5 is an end view of the upper part of the car, the part to the left being sectioned on the line 5 of Fig. 2. Fig. 6 is a transverse section of the upper part of the car showing the position of the roof doors when used to form a hopper.

In order to provide an unobstructed door opening in the center of the car roof, the longitudinal members 1 of the roof framing are spaced from the center of the car at the portions thereof occupied by the door opening, as illustrated in Fig. 3. The doors 2 are hinged at their outer edges, as illustrated. On the under side of the inner edges of the doors I secure angle irons 3 adapted to strengthen the door and to rest upon the angle irons or other projecting parts 4 which are secured to the transverse members 6 of the roof framing. By these means the doors are firmly supported at their ends and near the inner edge thereof, as clearly illustrated in Figs. 2 and 3. The running board 7 may be constructed in the usual manner upon the part of the car roof not occupied by the doors. The part of the running board 7' over the doors, however, is secured to the doors and forms part thereof, half of the running board being secured to each of the adjoining doors.

By means of the construction described I provide a clear and unobstructed opening extending across the center of the car roof, thus affording free access to the interior of the car for the purpose of loading the same. The doors, furthermore, may be used, when secured in partially open position, to form a hopper, thus facilitating the loading of the car. For this purpose the doors may be opened somewhat beyond a vertical position so that they will slope outward from the door opening, and may be secured in this position by means of blocks or otherwise.

A convenient means for supporting the door in position to form the hopper is shown in Fig. 6 and consists merely of a brace 10 placed in position to hold the door at the desired inclination. A cleat 11 may be secured to the car roof for the purpose of preventing the lower end of the brace from slipping, and the upper end of the brace may rest against the outer face of the door 2 and the edge of the running-board 7. I make no claim to the specific form of means for supporting the roof doors in position to form a hopper, but do claim the broad idea of utilizing roof doors for the purpose of forming an upper hopper to be used in loading a car.

In order to render the doors water-proof I cover them with galvanized iron or other sheet metal suitable for the purpose.

What I claim is:

In a car, a roof framing comprising transverse members spaced apart the length of each door opening, longitudinal members spaced from the center of the car to leave each door opening unobstructed across the longitudinal center of the car, means for supporting said doors in inclined position to form a hopper, strengthening members attached to said doors at their inner edges, and means upon the transverse members for supporting the ends of said strengthening members.

EDWARD POSSON.

Witnesses:
W. T. JONES,
NORMAN A. STREET.